(12) United States Patent
Bran et al.

(10) Patent No.: US 10,313,514 B1
(45) Date of Patent: Jun. 4, 2019

(54) DEVICE REGISTRY FOR MEDIATING COMMUNICATION SESSIONS

(71) Applicant: Plantronics, Inc., Santa Cruz, CA (US)

(72) Inventors: Cary Bran, Seattle, WA (US); Shantanu Sarkar, San Jose, CA (US)

(73) Assignee: Plantronics, Inc., Santa Cruz, CA (US)

( * ) Notice: Subject to any disclaimer, the term of this patent is extended or adjusted under 35 U.S.C. 154(b) by 0 days.

(21) Appl. No.: 15/901,809

(22) Filed: Feb. 21, 2018

(51) Int. Cl.
*H04M 3/42* (2006.01)
*H04M 3/02* (2006.01)

(52) U.S. Cl.
CPC ......... *H04M 3/42272* (2013.01); *H04M 3/02* (2013.01); *H04M 3/42314* (2013.01)

(58) Field of Classification Search
CPC . H04M 3/02; H04M 3/42272; H04M 3/42314
USPC ...................................... 379/201.01, 201.02
See application file for complete search history.

(56) References Cited

U.S. PATENT DOCUMENTS

| | | | |
|---|---|---|---|
| 5,790,648 A * | 8/1998 | Bailis | H04L 29/06 370/466 |
| 7,656,870 B2 | 2/2010 | Ravikumar et al. | |
| 8,762,156 B2 | 6/2014 | Chen | |
| 2005/0043023 A1* | 2/2005 | Romeo | H04L 41/00 455/423 |
| 2008/0281971 A1 | 11/2008 | Leppanen et al. | |
| 2008/0317219 A1 | 12/2008 | Manzardo | |
| 2010/0189094 A1* | 7/2010 | Gray | H04L 12/66 370/352 |
| 2010/0296640 A1* | 11/2010 | Stucker | H04M 3/42195 379/93.17 |
| 2011/0177801 A1* | 7/2011 | Heit | H04M 3/42263 455/417 |
| 2011/0177818 A1* | 7/2011 | Heit | H04M 3/58 455/436 |
| 2012/0117250 A1 | 5/2012 | Santamaria et al. | |
| 2015/0049867 A1* | 2/2015 | Jafry | H04W 36/365 379/201.01 |
| 2016/0062983 A1 | 3/2016 | Jung et al. | |

* cited by examiner

*Primary Examiner* — Harry S Hong
(74) *Attorney, Agent, or Firm* — Jeremy S. DesRosier (57) ABSTRACT

A method for mediating a communication session between a first user and a second user is disclosed. The method includes storing, in a registry, device information for the second user. The device information includes a list of two or more devices associated with the second user, and, for each device, a list of one or more capabilities of the device. The method also includes selecting, for a communication session of a first type, a second device from the list of two or more devices by sorting the plurality of device information. Additionally, the method includes receiving a request to open a communication session with the second user. The request originates from a first device of the first user and includes a first session type identifier of the first type. Further, the method includes, in response to receiving the request, returning a response including device information of the second device.

20 Claims, 6 Drawing Sheets

| | Device 1 ID | Device 1 Type | Device 1 Capabilities | Device 2 ID | Device 2 Type | Active Device 2 capability | Existing IM |
|---|---|---|---|---|---|---|---|
| user_1 | headset_1 | Wi-Fi Headset | audio, wideband_audio, secure | | | | |
| user_2 | smartphone_2 | Smartphone | audio, wideband_audio, video | laptop_2 | Windows laptop | audio, wideband_audio, video | user_3 |
| user_3 | laptop_3 | Apple laptop | audio, wideband_audio, video | headset_3 | Wi-Fi Headset | audio, wideband_audio, secure | user_2 |
| ... | | | | | | | |
| user_n | headset_n | Wi-Fi Headset | audio, wideband_audio, secure | | | | |

| | audio | wideband_audio | video | secure |
|---|---|---|---|---|
| user_1 | headset_1 | headset_1 | *wideband_audio | headset_1 |
| user_2 | smartphone_2 | smartphone_2 | laptop_2 | smartphone_2 |
| user_3 | laptop_3 | headset_3 | laptop_3 | *wideband_audio |
| ... | | | | |
| user_n | headset_n | *audio | *audio | headset_n |

DEVICE REGISTRY FOR MEDIATING COMMUNICATION SESSIONS

FIELD

The present disclosure relates generally to the field of telecommunications. More particularly, the present disclosure relates to mediating communication sessions according to device capabilities.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Network-addressable telecommunications headsets— headsets that are capable of directly attaching to an IP-based network for initiating and receiving calls independent of a host device, such as a mobile phone or computer—are expected to increase the collaboration and productivity of workers in office environments. All headsets, however, are effectively precluded from including traditional user control mechanisms, such as displays and touch screens, that are found on other devices such as mobile phones and computers. In other words, a user-operable control that relies on displaying visual content to a user is of limited use when the display is worn on top of or on the side of the user's head. Accordingly, headsets generally have limited user interfaces, and often rely on a fixed arrangement of physical buttons. Because of these limitations, a network-addressable headset may lack the user-operable controls that enable a user to quickly determine who is online, or open a new voice communication session. In some cases, voice recognition may help, by allowing the calling party to select which device the called party is alerted on (e.g., "call Bob's mobile," "call Bob at home," "call Bob at work," etc.), but this is a static model that initiates a call from the voice recognition device to a device of the called party, as specifically identified by the calling party. This model lacks flexibility, and relies on limited user knowledge to anticipate the best call option.

SUMMARY

In general, in one aspect, an embodiment includes a method for mediating a communication session between a first user and a second user. The method includes storing, in a registry, a plurality of device information for the second user. The plurality of device information for the second user includes a list of two or more devices associated with the second user, and, for each device of the two or more devices associated with the second user, a list of one or more capabilities of the device. Also, the method includes selecting, for a communication session of a first type, a second device from the list of two or more devices associated with the second user by sorting the plurality of device information for the second user. Additionally, the method includes receiving a request to open a communication session with the second user. The request originates from a first device of the first user and includes a first session type identifier of the first type. Further, the method includes, in response to receiving the request, returning a response including device information of the second device.

In general, in one aspect, an embodiment includes a computer program product including machine readable instructions for implementing a process for mediating a communication session between a first user and a second user. The process for mediating the communication session between the first user and the second user includes storing, in a registry, a plurality of device information for the second user. The plurality of device information for the second user includes a list of two or more devices associated with the second user, and, for each device of the two or more devices associated with the second user, a list of one or more capabilities of the device. Also, the process for mediating the communication session between the first user and the second user includes selecting, for a communication session of a first type, a second device from the list of two or more devices associated with the second user by sorting the plurality of device information for the second user. Additionally, the process for mediating the communication session between the first user and the second user includes receiving a request to open a communication session with the second user. The request originates from a first device of the first user and includes a first session type identifier of the first type. Further, the process for mediating the communication session between the first user and the second user includes, in response to receiving the request, returning a response including device information of the second device.

In general, in one aspect, an embodiment includes a system for mediating a communication session between a first user and a second user. The system comprises a device registry, a sorting engine, a network interface, at least one processor, and memory coupled to the at least one processor. The memory stores instructions, which when executed by the at least one processor, cause the at least one processor to perform a process, the process including receiving, via the network interface, a plurality of device information for the second user. The process further includes storing, in the device registry, the plurality of device information for the second user such that the device registry includes a list of two or more devices associated with the second user, and, for each device of the two or more devices associated with the second user, a list of one or more capabilities of the device. The process also includes, for a communication session of a first type, selecting a second device from the list of two or more devices associated with the second user by executing the sorting engine against the device registry. The process additionally includes receiving, via the network interface, a request to open a communication session with the second user, and, in response to receiving the request, returning, via the network interface, a response including device information of the second device. The request originates from a first device of the first user and includes a first session type identifier of the first type.

The details of one or more implementations are set forth in the accompanying drawings and the description below. Other features will be apparent from the description and drawings, and from the claims.

DETAILED DESCRIPTION

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named the elements. For example, a first element is distinct from a second element, and the first element may encompass more than one element and succeed (or precede) the second element in an ordering of elements.

For a long time, each person was associated with a single device—usually a desk-based telephone—by which they could initiate and receive voice communications with other parties. With the proliferation of laptop and desktop computers, mobile phones, smartphones, tablet computers, wearables, and IP-based telephony, at any moment a given person may be associated with numerous different devices by which they can be contacted by others. Further, each of these devices may be associated with one or more different phone numbers. As a result, to reach another party, a calling party may need to successively call two or more different numbers and/or devices of the called party. Prior art solutions have attempted to remedy the confusion that can arise from such circumstances by simultaneously alerting a user to an incoming communication on all of the user's devices. However, when all of the user's devices are not equally capable, simultaneously ringing each device is not an appropriate solution. For example, it is of little value to alert a user of an incoming video call using a device that is without video calling capability.

The inventors of the present disclosure anticipate that this problem will become increasingly common as wearable devices gain direct access to IP-based networks and become peer devices, rather than slaves as has been the case historically. For example, as head-worn audio devices such as headsets, and other devices such as watches, are enhanced with Wi-Fi and cellular connectivity, they may serve as a voice over Internet Protocol (VoIP) endpoint without relying on a more advanced host device, such as a smartphone or computer.

In addition, the user interface (UI) mechanisms of wearable devices are often limited in comparison to traditional host devices. For example, headsets often lack a display to present a graphical UI to a user. Accordingly, although a headset may be capable of direct network access, it may lack the physical controls that provide for an efficient way to open communications sessions. For example, without a touch screen, it may be cumbersome to call a specific person using only an IP-connected headset. One solution to this problem requires the calling user to navigate a decision tree using voice prompts beginning with a contact list lookup, followed by questions back to the calling user (e.g., "call Bob . . . at home," etc.). This is a multi-step process that often results in an error which requires the user to restart the process from the beginning.

In general, embodiments of the invention provide a system, method, and computer program product for facilitating the communication of users via less conventional VoIP telephony devices, such as Wi-Fi headsets and other wearable devices. In particular, by maintaining a registry that tracks user and device associations, as well as the capabilities of the various devices, the systems and methods disclosed herein maximize the communications between two parties, without any additional effort by either party. In particular, the systems and methods disclosed herein ensure that, despite the number of devices a user may own, he or she is easily reached by others using a medium and device that is most appropriate at the time of the call. Further, the systems and methods disclosed herein ensure that a user of a Wi-Fi headset may easily and efficiently initiate outgoing calls, without traversing a menu of call options.

Figure 1:
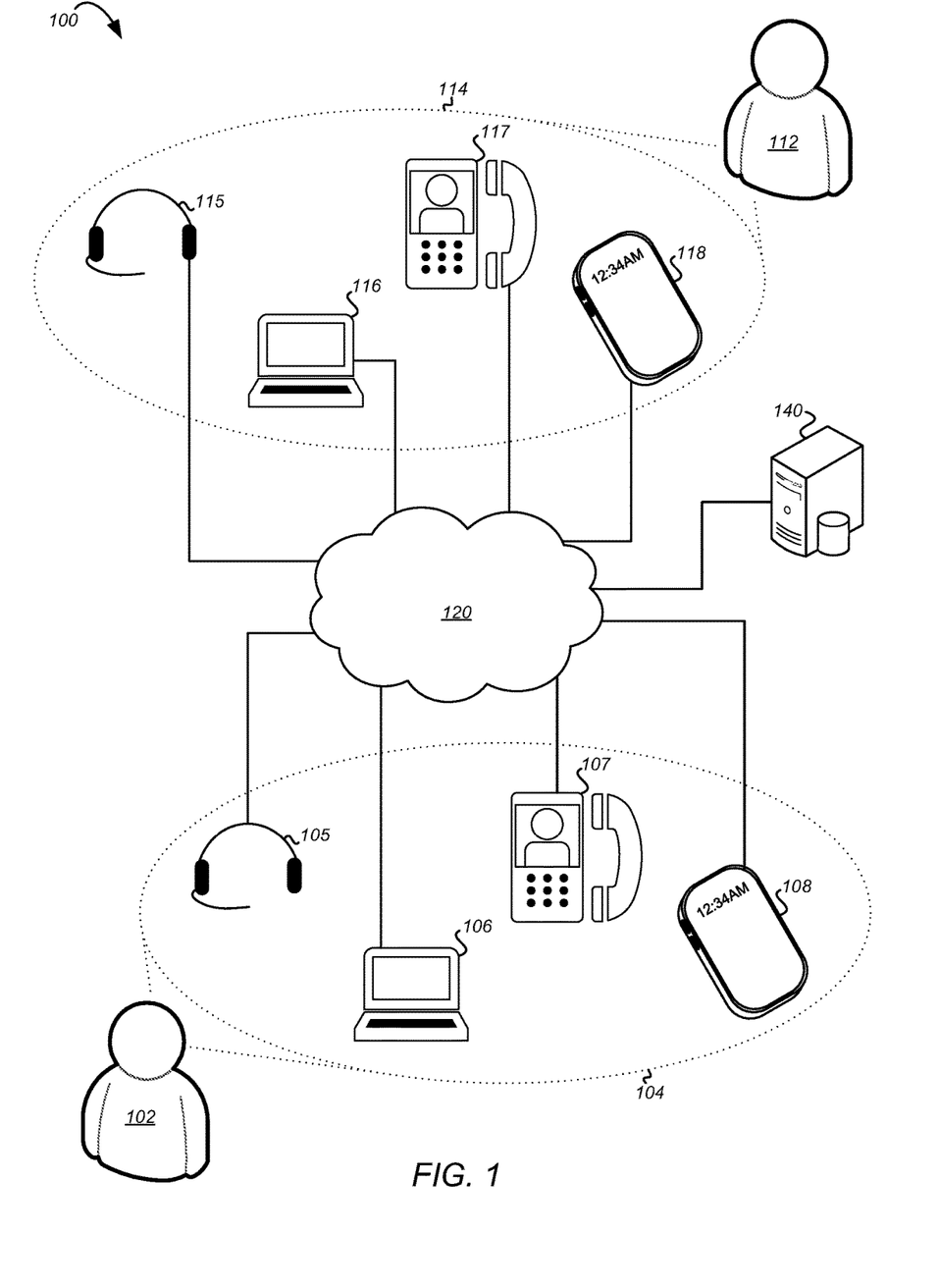
FIG. 1 depicts a system in which communications sessions are mediated using a device registry, in accordance with one or more embodiments of the invention.

FIG. 1 shows a system 100 for mediating communication sessions, according to one or more embodiments. Although the elements of the system 100 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 1 may be omitted, repeated, and/or substituted. Accordingly, various embodiments may lack one or more of the features shown. For this reason, embodiments of the invention should not be considered limited to the specific arrangements of elements shown in FIG. 1.

As shown in FIG. 1, the system 100 includes a services registry server 140, a first plurality of devices 104, and a second plurality of devices 114, all of which are connected to a network 120. The first plurality of devices 104 are associated with a first user 102, and the second plurality of devices 114 are associated with a second user 112. As described herein, a user may include any person that is associated with one or more devices that are tracked in the device registry 140, which is described in further detail below. In one or more embodiments, the users 102 and 112 may be employees of the same company. Of course, however, no such relationship between the first user 102 and the second user 112 may exist.

In particular, and still referring to FIG. 1, the first user 102 is associated with a first mobile device 108, a first desk phone 107, a first computer 106, and a first wireless headset 105; and the second user 112 is associated with a second mobile device 118, a second desk phone 117, a second computer 116, and a second wireless headset 115. As described herein, each the mobile devices 108 and 118 may include a cellular phone, a mobile phone, a smartphone, or a tablet device. Further, each of the desk phones 107 and 117 may include any hardware device with a dial pad that is utilized to make outgoing telephone calls and/or receive incoming telephone calls. Each of the computers 106 and 116 may include a desktop or laptop computer. Each of the computers 106 and 116 may include software for sending and receiving voice and/or video communications over the network 120, such as a VoIP client. Similarly, the mobile devices 108 and 118 may execute a VoIP client. Each of the wireless headsets 105 and 115 includes a telecommunications headset having a microphone and at least one speaker capsule. Each of the wireless headsets 105 and 115 is operable to directly access the network 120 and serve as a VoIP endpoint, without reliance on a host device such as a smartphone or computer. For example, each of the wireless headsets 105 and 115 may include a Wi-Fi transceiver for wirelessly connecting to the network 120. For purposes of illustration, each of the first user 102 and the second user 112 are shown to be associated with a parallel set of devices 104 and 114, however it is understood that use of the device registry server 140 is not limited to such circumstance.

Each of the devices 105-108 and 115-118 of the users 102 and 112, respectively, is shown in communication with a network 120. The network 120 includes any private and/or public communications network, wired and/or wireless, such as a local area network (LAN), wide area network (WAN), public switched telephone network (PSTN), and/or the Internet. Each of the devices 105-108 and 115-118 may connect to the network 120 using any suitable wired or wireless link. The network 120 may support standards such as Ethernet, wireless fidelity (Wi-Fi), etc., and may be used by any of the devices 105-108 and 115-118 for communicating with any of the other devices 105-108 and 115-118. For example, the first user 102 may use his or her desk phone 107 to call the second user 112 on his or her wireless headset 115; the first user 102 may use his or her computer 106 to initiate a video conference with the second user 112 on his or her mobile device 118; or the first user 102 may use his or her wireless headset 105 to place a wideband audio call to second user 112 on his or her computer 116.

The association of numerous devices with a single user, as depicted in FIG. 1, is now commonplace for many office workers. In other words, it's common for a given office employee to carry a cellular phone such as a smart phone, as well as laptop computer that is associated with its own VoIP-based phone number. Still yet, the user may have a desk phone installed in his or her office, which may have its own separate phone number, or share the VoIP-based phone number of the laptop. Accordingly, for the first user 102 to successfully call the second user 112, the first user 102 must call one of the devices 115-118 while it is in proximity to the second user 112. In prior art systems, this may require that the first user 102 have some prior knowledge of where the second user 112 may be at a given time, or may require that the first user 102 sequentially call two or more of the devices 115-118 until the second user 112 answers. Others have attempted to solve this problem by simultaneously ringing all of the user's devices at the same time, until one of the devices is used to answer the incoming call. For example, each of the devices 115-118 of the second user 112 may simultaneously alert the second user 112 of an incoming call, and enable the second user 112 to answer the call. When all of the user's devices are equally capable, this may be a suitable solution. For example, where each of the user's smartphone, laptop, and tablet are all capable of sending and receiving text messages, video calls, and audio calls, simultaneously alerting the user at all three devices is a practical solution. However, when all of a user's devices are not equally capable, simultaneously ringing each of them is not an appropriate solution. For example, there is likely little benefit to notifying either of the users 102 and 112 of an incoming video call on a device that lacks video calling functionality, such as the wireless headsets 105 and 115.

Still further, where the UI of a device is limited, it is more cumbersome to create a new outgoing communication session. For example, because the wireless headsets 105 and 115 lack GUIs, as found on the other devices of the users 102 and 112, it may be cumbersome to call a specific person at a specific device using only the headset.

The device registry server 140 solves each of these issues. First, the device registry server 140 allows the users 102 and 112 to remain available to receive incoming communication sessions from video-capable devices, where the communication sessions have been negotiated according to the functional limitations of the wireless headsets 105 and 115 when appropriate. Also, the device registry server 140 allows the users 102 and 112 to initiate an outgoing call using their wireless headsets 105 and 115, without specifically identifying the device or phone number that should be used for the called party. Accordingly, the device registry server 140 enables efficient communication between the users 102 and 112 by eliminating any problems that may arise due to a request for a new communication session between two devices of dissimilar capabilities.

In particular, the device registry server 140 mediates new communication sessions for the devices 104 and 114 connected to the network 120. As used herein a "communication session" includes a semi-permanent interactive information interchange, between a device of a first user and another device of a second user, in which audio and/or video is exchanged in real time or near real time. The device registry server 140 may differentiate between two or more distinct types of communication sessions. For example, the device registry server 140 may differentiate between an audio call (e.g., voice audio sampled at less than or equal to 8 kHz, etc.), a wideband audio call (e.g., voice audio sampled at greater than 8 kHz, 16 kHz, etc.), a video call (e.g., a session in which two parties exchange both audio and video streams, etc.), and a secure call (e.g., an exchange of voice audio that is encrypted end-to-end, etc.).

As noted above, the device registry server 140 may track relationships between the users 102 and 112 and their devices 104 and 114. For example, with reference to FIG. 1, the device registry server 140 may maintain a record indicating that the first wireless headset 105 belongs to the first user 102. Also, the device registry server 140 may maintain another record indicating that the first mobile device 108 belongs to the first user 102. Still yet, the device registry server 140 may maintain one or more records indicating that the second wireless headset 115, the second computer 116, the second desk phone 117, and the second mobile device 118 belong to the second user 112.

In one or more embodiments, the device registry server 140 may track the capabilities of the devices 104 and 114 of the users 102 and 112. Specifically, the device registry server 140 may maintain in a record that a given device is capable of a first type of communication session, but not capable of a second type of communication session. For example, the device registry server 140 may maintain a record indicating that the first wireless headset 105 of the first user 102 can join an audio call, a wideband audio call, and a secure call, but is not capable of joining a video call. As another example, the device registry server 140 may maintain a record indicating that the second mobile device 118 of the second user 112 can join each of an audio call, a wideband audio call, a secure call, and a video call.

In one or more embodiments, the device registry server 140 may track any suitable contextual information for any of the devices 104 and 114 of the users 102 and 112. Contextual information may include location information, network connectivity, a worn state, and/or a battery level. For example, the device registry server 140 may receive and store geolocation information from the second mobile device 118. As another example, the device registry server 140 may receive and store a service set identifier (SSID) of the wireless network to which the second computer 116 is connected. As yet another example, the device registry server 140 may receive and store a battery level of the first mobile device 108. Still yet, the device registry server 140 may receive and store a don/doff state from the first wireless headset 105.

In one or more embodiments, the device registry server 140 may track a status of non-voice communication sessions that exist between the devices 104 of the first user 102 and the devices 114 of the second user 112. For example, the device registry server 140 may include a record indicating that an instant messaging session exists between the first user 102 at the first computer 106 and the second user 112 on the second mobile device 118.

In one or more embodiments, the device registry server 140 may interface with a call control server, such as a VoIP private branch exchange (PBX). For example, the device registry server 140 and the call control server may be integrated, or may be separate servers that communicate over the network 120. The call control server may monitor and manage voice communications that are destined for and received by one or more of the devices 104 and 114. For example, the call control server may establish communication session connections to/from any of the devices 104 and 114, modify parameters of communication session connections at one or more of the devices 104 and 114, and terminate communication session connections at the devices 104 and 114. In one or more embodiments, the device registry server 140 may be notified by the call control server of any communication session established, modified, and/or terminated by the devices 104 and 114.

In one or more embodiments, the device registry server 140 may interface with a presence server, such as a Session Initiated Protocol (SIP) Presence Server. The presence server may collect and publish presence information of the users 102 and 112 and/or their devices 104 and 114. The presence server may send presence updates to entities (e.g., users, servers, etc.) that have subscribed to the presence information for a user. Thus, as an option, the device registry server 140 may track and/or subscribe to presence state changes of the users 102 and 112.

In one or more embodiments, the device registry server 140 may receive a request for a communication session from any of the devices 104 and 114 of the users 102 and 112. The request may indicate the type of communication session that is requested, as well as the user that is to be called. For example, the device registry server 140 may receive a request for a phone call with the second user 112 from the first mobile device 108 of the first user 102. As another example, the device registry server 140 may receive a request for a video call with the second user 112 from the first computer 106 of the first user 102.

Responsive to receiving a request, from a first user, for a communication session with a second user, the device registry server 140 generates a response that identifies a device of the second user. The device of the second user is determined using one or more of the ownership relationships of the devices 104 and 114, device capabilities of the devices 104 and 114, contextual information for the devices 104 and 114, the status of non-voice communication sessions at the devices 104 and 114, information from a call control server, and information from a presence server. In other words, the device registry server 140 may return, in its response, a device identifier of the device at which the first user 102 is most likely to be successful contacting the second user 112. For example, based on information regarding the second user 112 and his or her devices 114, a response from the device registry server 140 to the first mobile device 108 may identify the second mobile device 118 of the second user 112. The response may be returned to the device of the first user from which the request originated, or it may be returned to another device of the first user that is better suited for the communication session. In other words, continuing the above example, the request that prompted the response from the device registry server 140 may have originated from a device other than the first mobile device 108 of the first user 102. In one or more embodiments, the response may identify a communication type. The communication type identified in the response may be different than the communication type identified in the request. For example, the request may include video call communication type identifier, but the response may include a communication type identifier for something other than a video call (e.g., audio call, wideband audio call, etc.). In any case, the device that receives the response from the device registry server 140 may then open a communication session in accordance with the contents of the response.

In this way, and as described below, the device registry server 140 may receive a request for a given type of communication session with a particular user. Based on information regarding the users' devices, including their respective capabilities and locations, the device registry server 140 may determine that the called user is not available or not capable of a communication session of the requested type, but that the user may be reached by another type of communication session. The device registry server 140 may then instruct a device of the calling party how to reach the user. In this way, the device registry server 140 may mediate the creation of communication sessions for devices of disparate capabilities, while making it easier for users to initiate new communication sessions regardless of the device being used to make a call.

Figure 2A:
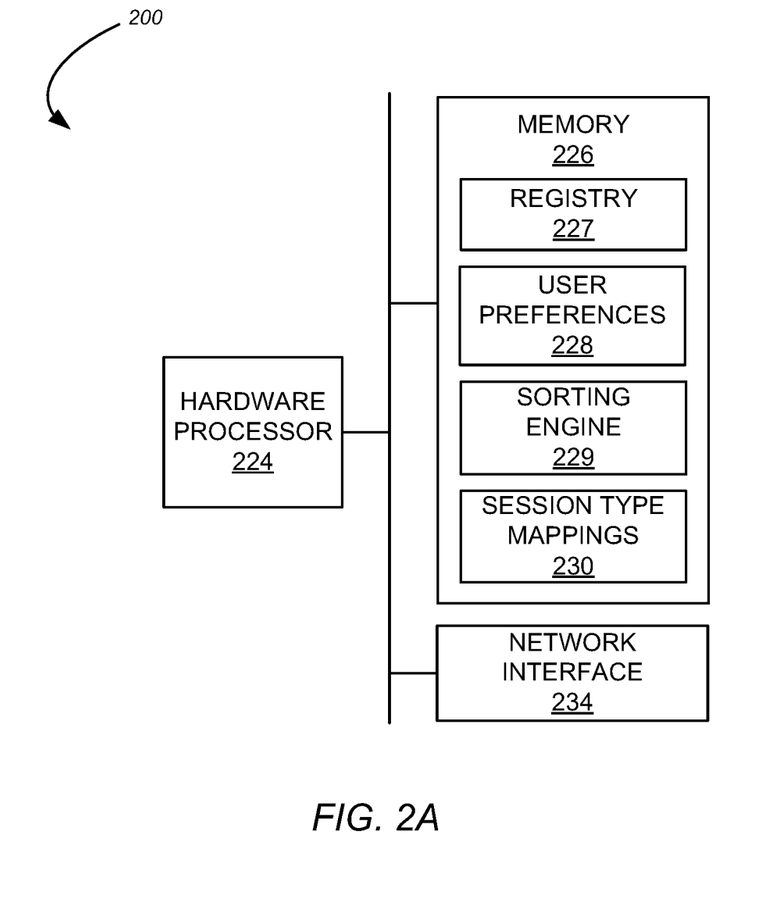
FIG. 2A is a block diagram depicting a device registry server, in accordance with one or more embodiments of the invention.

FIG. 2A shows a block diagram of a device registry server 200 according to one or more embodiments. Although the elements of the device registry server 200 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIG. 2A may be omitted, repeated, and/or substituted. Accordingly, various embodiments may lack one or more of the features shown. For this reason, embodiments of the invention should not be considered limited to the specific arrangements of elements shown in FIG. 2A. The elements of the device registry server 200 may be implemented in hardware, software, or combinations thereof.

As depicted in FIG. 2A, the device registry server 200 includes a hardware processor 224 operably coupled to a memory 226, and a network interface 234. In one or more embodiments, the hardware processor 224, the memory 226, and the network interface 234 may remain in communication over one or more communications busses.

As described herein, the network interface 234 includes any interface for communicating, using digital and/or analog signals, over a network. The network may include the network 120, described above in reference to FIG. 1. Via the network interface 234, the device registry server 200 may receive a request from a device of a user. Also, via the network interface 234, the device registry server 200 may return a response to a user's device. In one or more embodiments, via the network interface 234, the device registry server 200 may receive one or more of user/device associations (e.g., a first user 102 is associated with a first wireless headset 105, a second user 112 is associated with a second mobile device 118, etc.), a listing of capabilities of a user's device(s), contextual information for the user's device(s), and a status of non-voice communication sessions at the device(s). In one or more embodiments, via the network interface 234, the device registry server 200 may receive from a call control server information regarding communication sessions established, modified, and/or terminated at a device of a user. In one or more embodiments, via the network interface 234, the device registry server 200 may receive presence information regarding a user. In one or more embodiments, via the network interface 234, the device registry server 200 may receive user preferences.

As described herein, the memory 226 includes any storage device capable of storing information temporarily or permanently. The memory 226 may include volatile and/or non-volatile memory, and may include more than one type of memory. For example, the memory 226 may include one or more of SDRAM, ROM, and flash memory.

As depicted in FIG. 2A, the memory 226 stores a device registry 227, user preferences 228, a sorting engine 229, and session type mappings 230. As described herein, the device registry 227 includes records that associate each user with one or more devices. Further, the records of the device registry 227 identify which type(s) of communication sessions each device is capable of sending and receiving. The contents of the device registry 227 may be populated using information received from the devices tracked in the device registry 227. Accordingly, if a device receives a firmware update that results in the device being able to send and receive a new type of communication session, it may automatically notify the device registry 227. The contents of the device registry 227 may be populated manually, such as by a user associated with the devices.

Figure 2B:
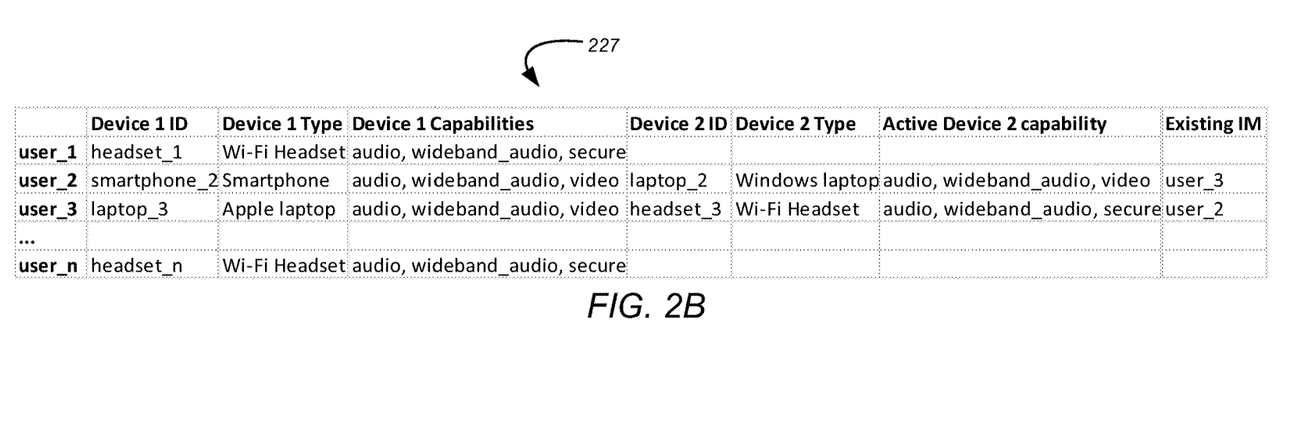
FIGS. 2B and 2C depict tables for a device registry and session type mappings, in accordance with one or more embodiments of the invention.

FIG. 2B shows an example of a table that may be maintained in the device registry 227. Although the contents of the device registry 227 are presented in one arrangement, other embodiments may feature other arrangements, and other configurations may be used without departing from the scope of the invention. For example, a data structure other than a table may be used. In one or more embodiments of the invention, one or more of the elements shown in FIG. 2B may be omitted, repeated, and/or substituted. Accordingly, various embodiments may lack one or more of the features shown. For this reason, embodiments of the invention should not be considered limited to the specific arrangement shown in FIG. 2B.

As depicted in FIG. 2B, the device registry 227 indicates that a first user (i.e., user_1) is associated with an active Wi-Fi headset (i.e., headset_1); that a second user (i.e., user_2) is associated with an active mobile device (i.e., smartphone_2) and Windows laptop computer (i.e., laptop_2); that a third user is associated with an active Apple laptop computer (i.e., laptop_3) and Wi-Fi headset (i.e., headset_3); and that a fourth user (i.e., user_n) is associated with an active Wi-Fi headset (i.e., headset_n). As an option, each Device ID may include a unique identifier, such as an IP and/or MAC address of the device. For purposes of simplicity and clarity, the device registry 227 is shown to include a row or record for each of four different users, however it is understood that in a production environment the device registry 227 may track hundreds, thousands, or hundreds of thousands of users. Still referring to FIG. 2B, the device registry 227 tracks the capabilities of each of the active devices of the four users. For example, a record in the device registry 227 indicates that the smartphone with device ID smartphone_2 of user_2 is capable of audio, wideband audio, and video calls. As another example, another record in the device registry 227 indicates that the Wi-Fi headset with device ID headset_1 of user_1 is capable of audio, wideband audio, and secure audio calls. Still yet, the records of the device registry 227 include the status of non-voice communication sessions that exist between devices tracked in the device registry 227. In particular, as shown in FIG. 2B, the device registry 227 indicates that user_2 and user_3 are engaged in an active instant messaging session.

As an option, the device registry 227 may include contextual information for a device tracked in the device registry 227, such as location information, network connectivity, a worn state, and/or a battery level. The location information may include, for example, a geographic location of the user (e.g., Santa Cruz, Calif., etc.), and/or a campus location of the user (e.g., in an open office setting, in his or her office, in a conference room, in a cafeteria, etc.). Also, the records of the device registry 227 may include a status of voice communication sessions that have been established to/from a device tracked in the device registry 227, such as if the device is currently being used for a call, or a call has been recently terminated. Still yet, the records of the device registry 227 may include presence information for users tracked in the device registry 227, such as whether a user in a meeting, out of office, busy, on a call, or available.

Referring again to FIG. 2A, the user preferences 228 include any explicitly provided call routing preferences of a user. For example, a user may indicate a preference to receive wideband audio calls at a wireless headset above any other of his or her devices that are capable of wideband audio. As another example, a user may indicate a preference to receive calls at his or her wireless headset when he or she is in an open office location. In one or more embodiment, the user preferences 228 may include any observed call routing preferences of a user. In other words, at least some of the user preferences 228 may be observed by recognizing patterns in device usage based on time of day, user location, don/doff status, etc. For example, while a user is out of the office, the user may send and receive calls exclusively using his or her mobile device. As another example, while the user is out of the country, the user may reject any incoming calls to his or her mobile device's cellular number while answering all incoming calls received at a VoIP client on the same device. As yet another example, a given user may never answer a call using his or her computer.

As described herein, the sorting engine 229 includes any rules-based sorting algorithm operable to generate the session type mappings 230 using the user preferences 228 and the device registry 227. The sorting engine 229 may include, for example, an algorithm that scores and/or ranks the devices of a user for several types of communication sessions in accordance with the user preferences 228. The sorting engine 229 generates the session type mappings 230. The session type mappings 230 include, for a tracked user, a record that identifies which device of the user should be used for a given type of communication session. Accordingly, the sorting engine 229 determines in advance how to respond, at least in part, to a request for a particular communication session type with a particular user. The sorting engine 229 may execute against the user preferences 228 and the device registry 227 to generate new session type mappings 230 for a user on a periodic basis (e.g., hourly, daily, etc.), or responsive to an event (e.g., new active device, change in user's presence state, the user donning a headset, etc.).

Figure 2C:
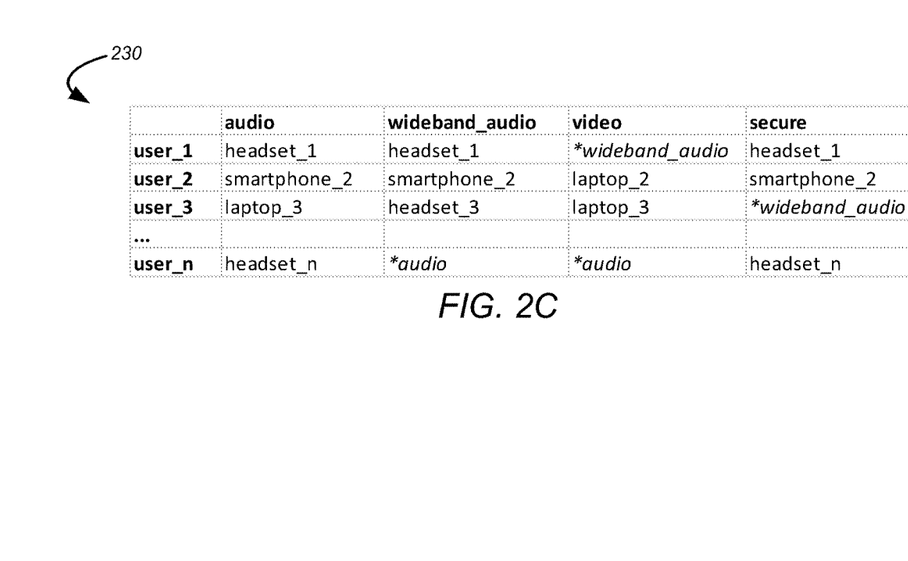

For example, FIG. 2C shows an example of a table that may be maintained as the session type mappings 230. Although the contents of the session type mappings 230 are presented in one arrangement, other embodiments may feature other arrangements, and other configurations may be used without departing from the scope of the invention. For example, a data structure other than a table may be used. In one or more embodiments of the invention, one or more of the elements shown in FIG. 2C may be omitted, repeated, and/or substituted. Accordingly, various embodiments may lack one or more of the features shown. For this reason, embodiments of the invention should not be considered limited to the specific arrangement shown in FIG. 2C.

As depicted in FIG. 2C, the session type mappings 230 set forth which device should be used for each user for each possible communication session type. For example, for a first user (i.e., user_1) a device with Device ID headset_1 should be used for audio calls, wideband audio, and secure calls. Further, as shown in the example of FIG. 2C, the first user does not have a device that supports the video call communication type, and requests for video calls with the first user should default to wideband audio (i.e., *wideband_audio) and its associated device (i.e., headset_1). As another example continuing to reference FIG. 2C, for a second user (i.e., user_2) a device with Device ID smartphone_2 should be used for audio calls, wideband audio, and secure calls; however, for communication sessions with the second user of the video call type, a device with Device ID laptop_2 should be used. Accordingly, while the first user is not currently capable of initiating and receiving video calls, the second user is. Still referring to FIG. 2C, the session type mappings 230 indicate that for a fourth user (i.e., user_n) a device with Device ID headset_n should be used for audio calls and secure calls; but the fourth user does not have a device that supports the wideband audio or video call communication types, and requests for wideband audio calls and video calls with the fourth user should fall back to standard audio (i.e., *audio) and its associated device (i.e., headset_n).

The sorting engine 229 executes on the hardware processor 224 to generate the session type mappings 230. In one or more embodiments, the hardware processor 224 is a high performance, highly integrated, and highly flexible system-on-chip (SOC), including signal processing functionality such as echo cancellation/reduction and gain control in another example. In one or more embodiments, the hardware processor 224 may include a variety of processors (e.g., digital signal processors, etc.), analog-to-digital converters, digital-to-analog converters, etc., with conventional CPUs being applicable.

Figure 3:
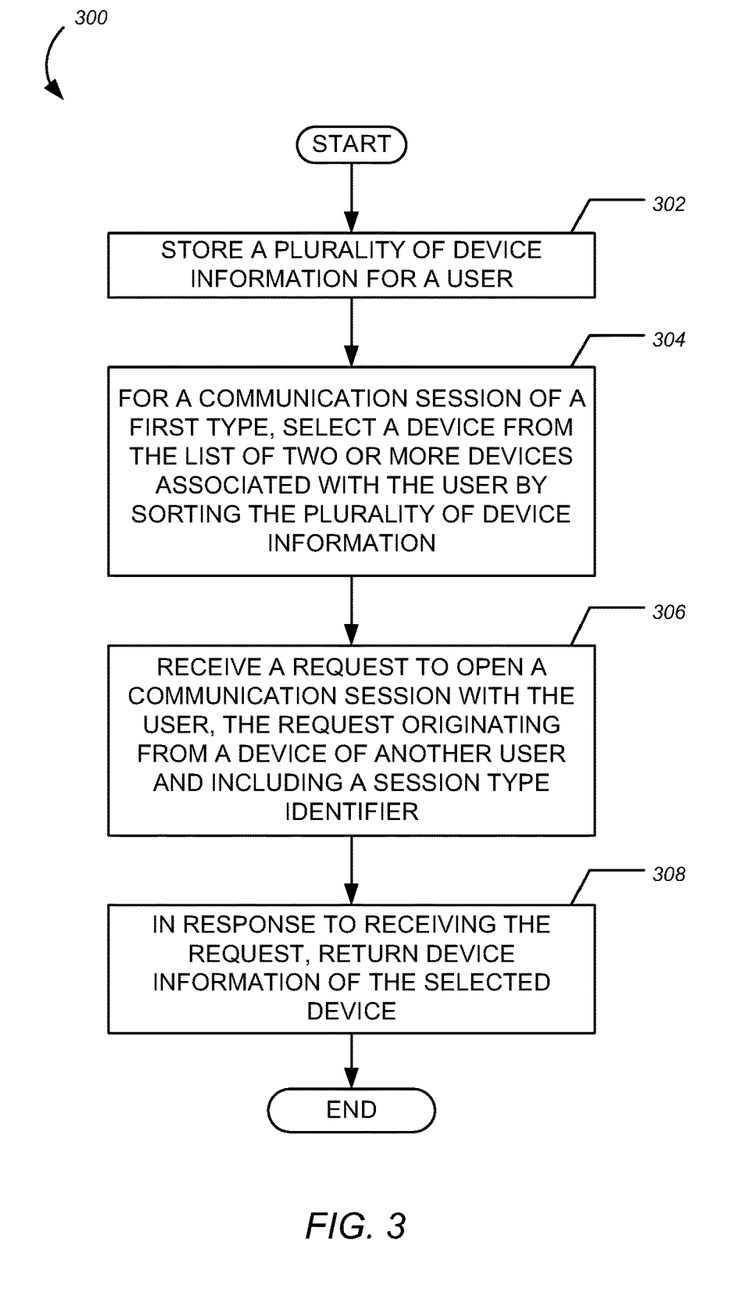
FIG. 3 is a flow diagram showing a method for mediating a communication session, in accordance with one or more embodiments of the invention.

FIG. 3 shows a flowchart of a method 300 for mediating a communication session between a first user and a second user, in accordance with one or more embodiments of the invention. While the steps of the method 300 are presented and described sequentially, one of ordinary skill in the art will appreciate that some or all of the steps may be executed in a different order, may be combined or omitted, and may be executed in parallel. Furthermore, the steps may be performed actively or passively. For example, some steps may be performed using polling or be interrupt driven in accordance with one or more embodiments of the invention. In one or more embodiments, the method 300 may be carried out by a device registry server, such as any of device registry servers 140 and 200, described above in reference to FIGS. 1 and 2, respectively.

At step 302, a plurality of device information is stored in a device registry. The device information pertains to two or more devices associated with the second user. Each of the devices may be owned by the second user, assigned to the second user, and/or used by the second user to make and receive calls. Each of the devices may be capable of participating in at least one type of communication session, such as a phone call, wideband audio call, video call, or secure call. For each listed device of the two or more devices associated with the second user, the device registry may include a list of one or more capabilities of the device. For example, the device registry may indicate that a first device of the second user is capable of participating in standard audio calls and wideband audio calls; and that a second device of the second user is capable of participating in video calls and secure calls.

In one or more embodiments, the device information for the second user may include a location of a device. For example, the device information may indicate that the user has two devices which are both located in an open office environment. As another example, the device information may indicate that the user's two devices are both currently away from the office; or that one is in Santa Cruz and the other is in San Francisco. In one or more embodiments, the device information for the second user may include a power or battery level of a device. For example, the device information may indicate that the user has two devices, where the first is fully charged and the other has less than 5% battery life.

At step 304, a device is selected, from the list of two or more devices associated with the second user, for a communication session of a first type. The device may be selected by sorting the device information of the second user. The device information of the second user may be sorted according to one or more user preferences of the second user. Accordingly, sorting the device information of the second user may include applying a rules-based sorting engine to the device information and user preferences of the second user. Selecting the device may include logging, in a suitable data structure, that calls for the second user of the first type of communication session should be directed to the selected device. For example, the selected device may be linked to the first type of communication session in a session type mapping. The selection may include traversing a pointer to a second type of communication session, as described above.

At step 306, a request is received to open a communication session with the second user. The request originates from a first device of a first user. In one or more embodiments, the device registry may store a plurality of device information pertaining to the devices of additional users, including the first user. The request may be for a new communication session. For example, at the time the request is received, the first user and the second user are not currently exchanging audio and/or video communications. The request may be to upgrade an existing communication session. For example, at the time the request is received, the first user and the second user may be currently exchanging audio/and or video communications, but the request is for a communication session of a type different than the current exchange. Also, the request includes a first session type identifier of the first type. For example, the request may include a session type identifier for an audio call, wideband audio call, a video call, or a secure call. In this way, the request includes a type of communication preferred by the first user.

In one or more embodiments, the request may be generated by the first device in response to an interaction of the first user with a user-operable control of the first device, such as a button or graphical user interface. In one or more embodiments, the request may be generated by the first device in response to a voice command from the first user, such as "call Sally," or "call Sally using wideband audio," or "start a video call with Sally." Accordingly, the first device may parse such a voice command to identify a party that the calling user wishes to call, as well as the connection type preferred by the first user, both of which may be inserted into the request by the first device.

In one or more embodiments, the request may arrive via a PBX. For example, the first device of the first user may reside outside of an enterprise network to which devices of the second user are connected. Accordingly, before establishing a connection between the first user and the second user, the PBX may send the request to the call registry server. Of course, however, it is understood that the request may arrive over a network from the first device without passing through a PBX.

At step 308, the device registry server returns a response responsive to the request. The response includes device information of the selected device, such as a Device ID or address.

In one or more embodiments, the response may be returned to a device of the first user. The response may be returned to the device from which the request, which was received at step 306, originated. For example, if the request originated from a mobile device of the first user, the response may be addressed to the mobile device of the first user. The response may be returned to another device of the first user. For example, if the request originated from a laptop computer of the first user, the response may be returned to a wireless headset of the first user. Accordingly, the response may be addressed to the wireless headset of the first user. The response may be returned to another device of the first user when the selected device requires a type of communication session outside of the capabilities of the requesting device.

In one or more embodiments, the response may be returned to a PBX. For example, if the second user resides on an enterprise network which the first device is outside of, the request may be received via a PBX. Accordingly, the contents of the response may be used by the PBX to connect the first user and the second user.

In one or more embodiments, the response may include a second session type identifier of a second type. Accordingly, the response may include a session type identifier that is different than the session type identifier received in the request. The second session type identifier may indicate to the receiving device what type of communication session should be opened with the second user. The session type identifier of the response may differ from the session type identifier of the request when the session type of the request is outside of the capabilities of the selected device.

Once the response is returned to a device of the requesting user or to a PBX, the device receiving the response may use the contents of the response to initiate a communication session with the second user at the second device.

Figure 4A:
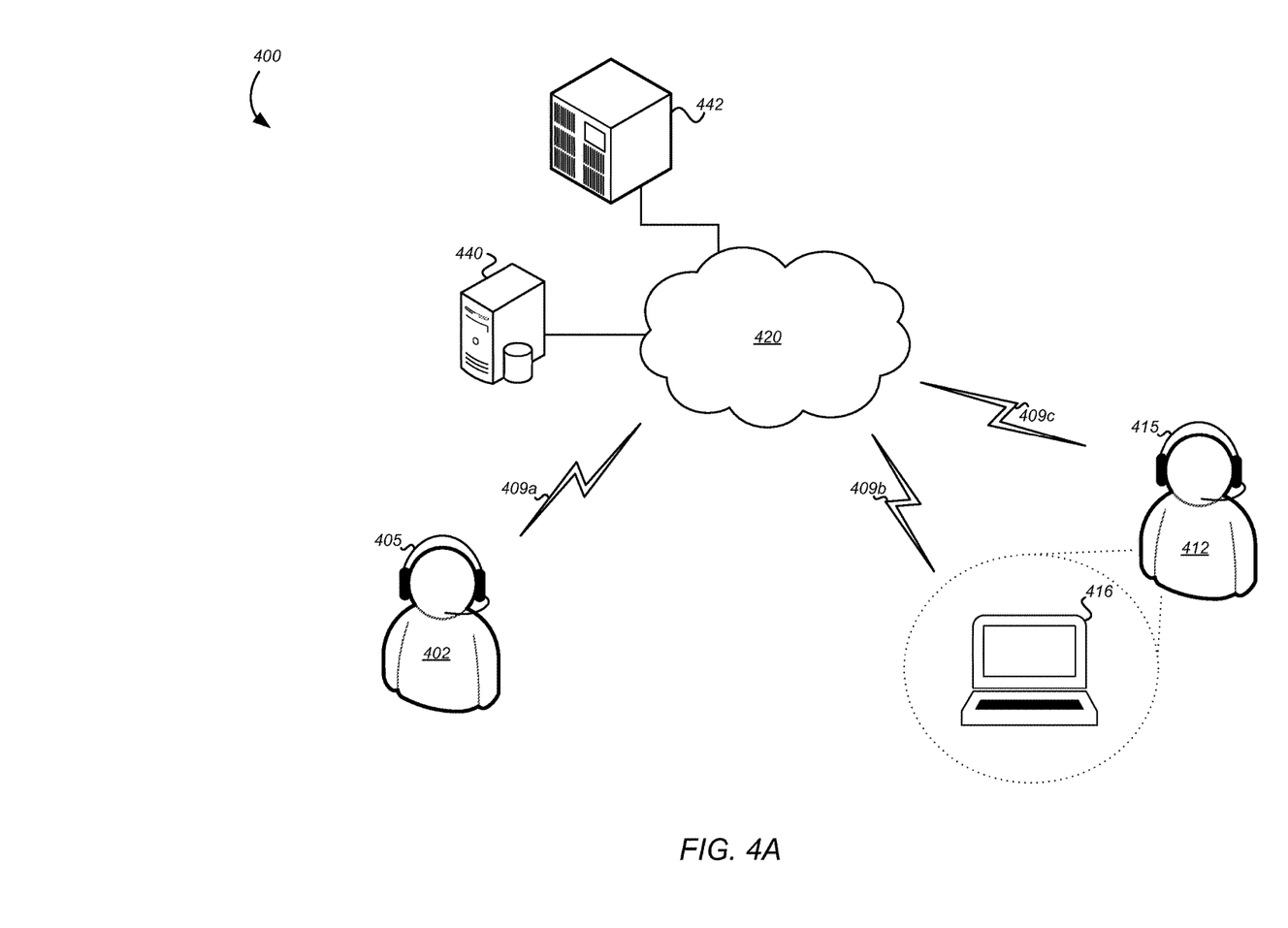
FIGS. 4A and 4B illustrate examples of a device registry server mediating communication sessions, in accordance with one or more embodiments of the invention.
Figure 4B:
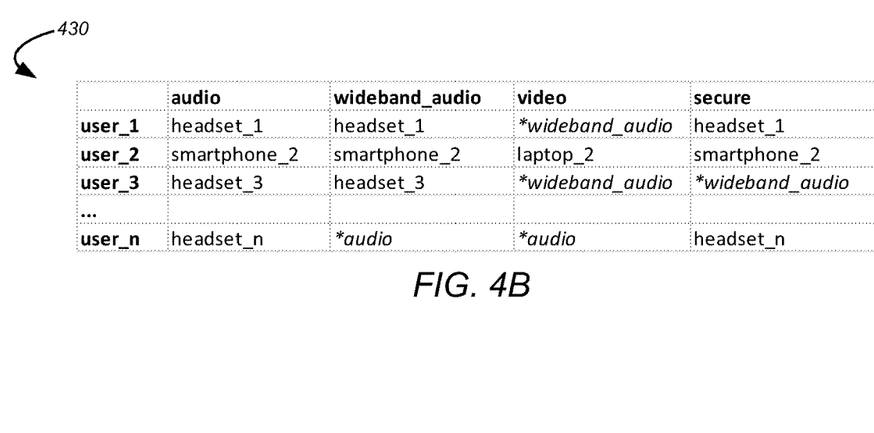

FIGS. 4A and 4B illustrate examples of a system 400 in which a device registry server mediates communication sessions, according to one or more embodiments. Although the elements of the system 400 are presented in one arrangement, other embodiments may feature other arrangements, and other configurations may be used without departing from the scope of the invention. For example, various elements may be combined to create a single element. As another example, the functionality performed by a single element may be performed by two or more elements. In one or more embodiments of the invention, one or more of the elements shown in FIGS. 4A and 4B may be omitted, repeated, and/or substituted. Accordingly, various embodiments may lack one or more of the features shown. For this reason, embodiments of the invention should not be considered limited to the specific arrangements of elements shown in FIGS. 4A and 4B.

As shown in FIG. 4A, the system 400 includes a device registry server 440 and a call control server 442 in communication with a network 420. Also, the system 400 includes a first wireless headset 405 of a first user 402 in communication, via a first wireless link 409a, with the network 420. Still yet, the system 400 includes a computer 416 and a second wireless headset 415 of a second user 412 in communication, via second and third wireless links 409b and 409c, respectively, with the network 420. Each of the wireless links 409 may include, for example, a cellular link or a Wi-Fi link.

The call control server 442 may include, for example, a session initiation protocol (SIP) server, a Real-time Transport Protocol (RTP) server, and/or a Real-time Transport Control Protocol (RTCP) server. In one or more embodiments, the call control server 442 may include an IP PBX.

Assume, in one example, that the contents of the device registry of the device registry server 440 are reflected in the device registry 227 of FIG. 2B, and the contents of the session type mappings of the device registry server 440 are reflected in the session type mappings 230 of FIG. 2C, where the first user 402 is tracked as user_n and the second user 412 is tracked as user_3. Thus, if a device of the second user 412 (i.e., user_3) originates a request for a video call with the first user 402 (i.e., user_n), the device registry server 440 will determine that such a communication session is not currently possible. In particular, the session type mapping for a video call with the first user 402 includes a pointer to the device of the first user 402 that is used for a standard audio call (i.e., headset_n). Accordingly, the device registry server 440 will return to the requesting device of the second user 412 a response that includes a communication type identifier for audio calls, as well the Device ID headset_n, for the preferred audio call device of the first user 402.

Extending the current example, the device registry server 440 may return a response to a device other than the requesting device. For example, if the second user 412 requests a wideband audio call by way of a voice command to the wireless headset 415 (i.e., Device ID headset_3), but the device registry server 440 determines that standard audio must be used instead, the device registry server 440 will then determine which device of the second user 412 has been selected for standard audio calls. As shown in FIG. 2C, the computer 416 (i.e., laptop with Device ID laptop_3) should instead be used for audio calls. Thus, although the second user 412 has requested a wideband audio call at the wireless headset 415, the device registry server 440 will return a response to the computer 416 of the second user 412, which instructs the computer 416 to initiate an outgoing standard audio call to the wireless headset 405 of the first user 402.

As another example, and extending the facts above, assume that the device registry of the server 440 also includes the location of the wireless headsets 405 and 415 and the computer 416 within a corporate campus (not shown in FIG. 2B). The second user 412 has recorded in his or her user preferences at the device registry server 440 that he or she does not want to receive calls at the computer 416 when in an open office area of the corporate campus. At one point during the day, while the second user 412 is in a private conference room, and the session type mappings 230 of FIG. 2C remain in effect, the first user 402 provides a voice command to the wireless headset 405 to call the second user 412 (e.g., "call the second user 412," etc.). In turn, the wireless headset 405 parses this command and sends a request to the device registry server 440, requesting a communication session of the voice call type with the second user 412. Responsive to this request, the device registry server 440 returns the Device ID of the computer 416 (i.e., laptop_3) and indication of the audio call communication type. At this point, the headset 405 may begin a call with the computer 416 via the call control server 442.

When the second user 412 returns to his or her desk in an open seating area of the campus, the locations of the wireless headset 415 and computer 416 are updated at the device registry of the server 440. This update triggers a sorting engine to generate the session type mappings 430 shown in FIG. 4B, using the preferences of the second user 412. Of interest, the Device ID of computer 416 will no longer be returned responsive to requests for audio calls with the second user 412. Instead, the Device ID of the wireless headset 415 (i.e., headset_3) of the second user 412 will be returned responsive to such requests. Accordingly, if the first user 402 provides another voice command to the wireless headset 405 to call the second user 412, the device registry server 440 will return, responsive to this second request, the Device ID of the wireless headset 415 (i.e., headset_3) and indication of the audio call communication type.

Returning to the above example, assume that the second user 412 never returns to the open office area, but instead spends the morning working on the computer 416, without the computer 416 plugged in to an AC power source. Also, assume the device registry of the server 440 receives updates regarding the battery level of the wireless headsets 405 and 415 and the computer 416 (not shown in FIG. 2B). As the battery of the computer 416 falls below a threshold level (e.g., 5%, 10%, etc.), the computer 416 reports this information to the device registry server 440, which triggers a sorting engine to generate the session type mappings 430 of FIG. 4B. Because the computer 416 is without adequate battery power to conduct a video call of more than a few minutes, if at all, the second user 412 is no longer available for video calls, and any requests for a video call with the second user 412 will default to wideband audio using the wireless headset 415 of the second user 412. Accordingly, if a user such as user_2 (not shown) requests a video call with the second user 412, the device registry server 440 will return in a response to user_2 the Device ID of the wireless headset 415 (i.e., headset_3) and indication of the wideband audio call communication type. Once the response is received, the call control server 442 may be used to setup the wideband audio call with the wireless headset 415.

By way of the systems and methods described above, a user may effectively send and receive voice communications using a device with limited UI mechanisms, such as a wireless headset or other wearable device. In particular, a calling party may rely on a device registry to mediate a connection with the called party according to the preferences of the users. Also, by way of the systems and methods described above, the device registry mediates the connection according to the capabilities of the devices of the two users, especially where the two users are using devices of disparate capabilities. Still yet, the systems and methods disclosed herein allow one user to quickly call another user without requiring advanced knowledge of which device the called party is currently using, or which devices of the called party may not currently be available.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). As used herein, the term "module" may refer to any of the above implementations.

A number of implementations have been described. Nevertheless, various modifications may be made without departing from the scope of the disclosure. Accordingly, other implementations are within the scope of the following claims.

What is claimed is:

1. A method for mediating a communication session between a first user and a second user, comprising:
    storing, in a registry, a plurality of device information for the second user, wherein the plurality of device information for the second user includes:
    a list of two or more devices associated with the second user, and for each device of the two or more devices associated with the second user, a list of one or more capabilities of the device;
    for a communication session of a first type, selecting a second device from the list of two or more devices associated with the second user by sorting the plurality of device information for the second user;
    receiving a request to open a communication session with the second user, the request originating from a first device of the first user and including a first session type identifier of the first type; and in response to receiving the request, returning a response including a portion of the plurality of device information associated with the second device.

2. The method of claim 1, wherein the portion of the plurality of device information associated with the second device is returned to the first device of the first user.

3. The method of claim 1, wherein the portion of the plurality of device information associated with the second device is returned to another device of the first user.

4. The method of claim 1, wherein the portion of the plurality of device information associated with the second device is returned to a private branch exchange (PBX) server.

5. The method of claim 1, wherein the plurality of device information for the second user includes, for each device of the two or more devices associated with the second user, a location of the device.

6. The method of claim 1, wherein the first session type identifier includes one of a voice call, a video call, and a wideband audio call.

7. The method of claim 1, wherein the plurality of device information for the second user includes, for each device of the two or more devices associated with the second user, a battery level of the device.

8. The method of claim 1, wherein the device information of the second device includes an address of the second device.

9. The method of claim 1, comprising returning to the first device of the first user, in response to receiving the request, a second session type identifier of a second type, wherein the second type is different than the first type.

10. A computer program product including machine readable instructions for implementing a process for mediating a communication session between a first user and a second user, the process for mediating the communication session between the first user and the second user comprising:
   storing, in a registry, a plurality of device information for the second user, wherein the plurality of device information for the second user includes:
   a list of two or more devices associated with the second user, and for each device of the two or more devices associated with the second user, a list of one or more capabilities of the device;
   for a communication session of a first type, selecting a second device from the list of two or more devices associated with the second user by sorting the plurality of device information for the second user;
   receiving a request to open a communication session with the second user, the request originating from a first device of the first user and including a first session type identifier of the first type; and
   in response to receiving the request, returning a response including a portion of the plurality of device information associated with the second device.

11. The computer program product of claim 10, wherein the portion of the plurality of device information associated with the second device is returned to the first device of the first user.

12. The computer program product of claim 10, wherein the portion of the plurality of device information associated with the second device is returned to another device of the first user.

13. The computer program product of claim 10, wherein the portion of the plurality of device information associated with the second device is returned to a private branch exchange (PBX) server.

14. The computer program product of claim 10, wherein the plurality of device information for the second user includes, for each device of the two or more devices associated with the second user, a location of the device.

15. The computer program product of claim 10, wherein the first session type identifier includes one of a voice call, a video call, and a wideband audio call.

16. The computer program product of claim 10, wherein the plurality of device information for the second user includes, for each device of the two or more devices associated with the second user, a battery level of the device.

17. The computer program product of claim 10, wherein the portion of the plurality of device information associated with the second device includes an address of the second device.

18. The computer program product of claim 10, the process for mediating the communication session between the first user and the second user comprising:
   returning to the first device of the first user, in response to receiving the request, a second session type identifier of a second type,
   wherein the second type is different than the first type.

19. A system for mediating a communication session between a first user and a second user, comprising:
   a device registry;
   a sorting engine;
   a network interface;
   at least one processor; and
   memory coupled to the at least one processor, the memory having stored therein instructions which when executed by the at least one processor, cause the at least one processor to perform a process including:
   receiving, via the network interface, a plurality of device information for the second user;
   storing, in the device registry, the plurality of device information for the second user such that the device registry includes:
   a list of two or more devices associated with the second user, and
   for each device of the two or more devices associated with the second user, a list of one or more capabilities of the device;
   for a communication session of a first type, selecting a second device from the list of two or more devices associated with the second user by executing the sorting engine against the device registry;
   receiving, via the network interface, a request to open a communication session with the second user, the request originating from a first device of the first user and including a first session type identifier of the first type; and
   in response to receiving the request, returning, via the network interface, a response including a portion of the plurality of device information associated with the second device.

20. The system of claim 19, the instructions causing the at least one processor to perform the process including:
   returning to the first device of the first user, in response to receiving the request, a second session type identifier of a second type,
   wherein the second type is different than the first type.

* * * * *